Nov. 22, 1960

W. M. HASELTON 2,960,996

VACUUM RELIEF VALVE

Filed May 7, 1957

INVENTOR.
William M. Haselton
BY
E. Manning Giles
Att'y.

Nov. 22, 1960  W. M. HASELTON  2,960,996
VACUUM RELIEF VALVE

Filed May 7, 1957  2 Sheets-Sheet 2

INVENTOR.
William M. Haselton
BY
E. Manning Giles
Att'y.

United States Patent Office 2,960,996
Patented Nov. 22, 1960

2,960,996

VACUUM RELIEF VALVE

William M. Haselton, Cedar Rapids, Iowa, assignor to Cherry-Burrell Corporation, Chicago, Ill., a corporation of Delaware Filed May 7, 1957, Ser. No. 657,656

4 Claims. (Cl. 137—116)

My invention relates to a pressure-operated vacuum relief valve and has reference more particularly to a sanitary type valve through which milk or other liquid may be introduced under pressure into a vacuum processing chamber after first bleeding to atmosphere any air trapped in the milk supply duct.

Valves of this general type although of more complex design are shown in Patent No. 2,756,772 to S. B. Clark and Patent No. 2,772,693 to A. H. Boileau et al., and these have been used in the liquid supply ducts for such processors as the vacuum pasterizer shown in Patent No. 2,665,628 and in the pending application of John C. Walsh and myself, Serial No. 618,241, for a Vacuum Steam Processor, now Patent No. 2,944,479.

Processors of these types generally involve the use of a sub-atmospheric pressure chamber into which milk or other liquid is introduced under pressure. In order to maintain a partial vacuum in the chamber, it is necessary to avoid introduction of air, such as from the liquid supply line, into the chamber. The valve must also provide positive shut-off when liquid is not being introduced into the chamber so as to avoid pulling a vacuum on the piping leading to the chamber.

It is, therefore, a principal object of my invention to provide a sanitary valve which will resist admission of liquid from a liquid supply line to a low pressure processing chamber until the pressure at which such liquid is delivered reaches a predetermined pressure.

It is another object of my invention to bleed any air trapped in the liquid supply line to atmosphere before opening the valve leading to the processing chamber.

It is a further object of my invention to prevent loss of vacuum in the processing chamber by assuring that the valve closes and seals whenever pressure on the liquid to the chamber drops below a predetermined level.

It is a still further object of my invention to design a valve having the foregoing features which is simple in design, low cost, and efficient, these and other objects being accomplished as hereinafter described, reference being made to the accompanying drawing in which Fig. 1 is a diagrammatic representation of a valve embodying my invention interposed between a pump and a liquid processing device;

Figure 1:
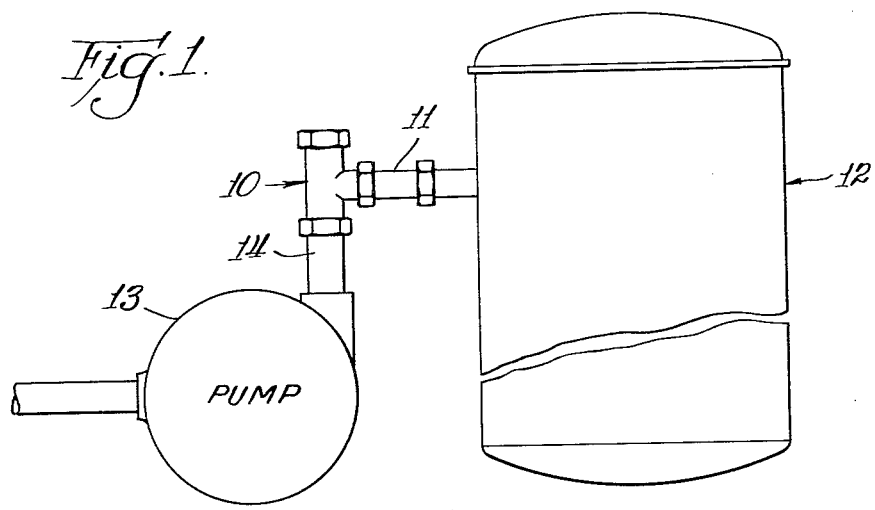

Referring now to the drawing, the valve embodying my invention is designated generally by the reference numeral 10 and it is shown in Fig. 1 as being connected through a short duct 11 to a vacuum processing chamber 12. Milk or other liquid is supplied by a pump 13 through a liquid supply duct 14 to the valve 10 and through the short duct 11 to the vacuum processing chamber 12.

The valve 10 has a T-shaped main body with a liquid inlet 15 at one end and liquid outlet 16 projecting laterally at the side of the valve 10. At the end remote from the liquid inlet 15, the valve 10 is externally threaded to receive a nut 17 which is in turn holds a cap 18 in place at the end of the valve 10. A radial slot 19 is provided in the threaded portion of the valve 10 at the cap end, said slot 19 being of a length greater than the depth of the nut 17 so that when the nut 17 and cap 18 are engaged in place at the end of the valve 10 air communication is provided from the interior of the valve 10 through the slot 19 as indicated by the arrow in Fig. 2. The lower end of the slot 19 is preferably cut obliquely as shown to insure that any moisture collecting therein will drain to the exterior of the valve 10.

Figure 2:
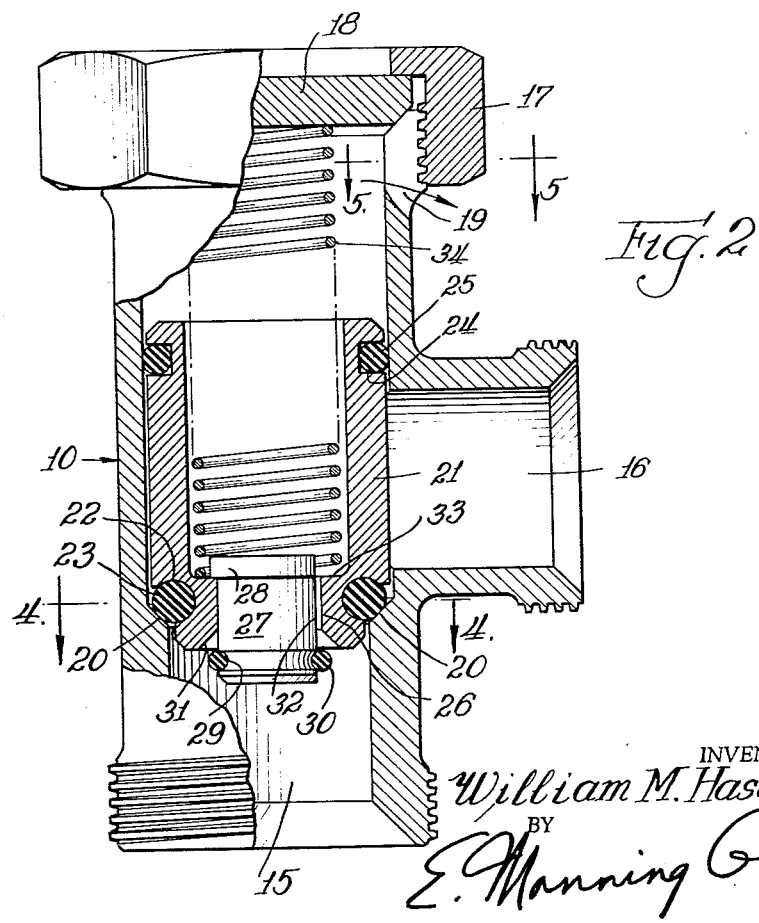
Fig. 2 is a side view of said valve with portions broken away to show in section the component parts of the valve in closed position.

The inside diameter of the valve 10 is reduced at its inlet end to provide a peripheral bevelled seat 20 between said inlet 15 and the lateral outlet 16 as shown in Fig. 2.

Figure 3:
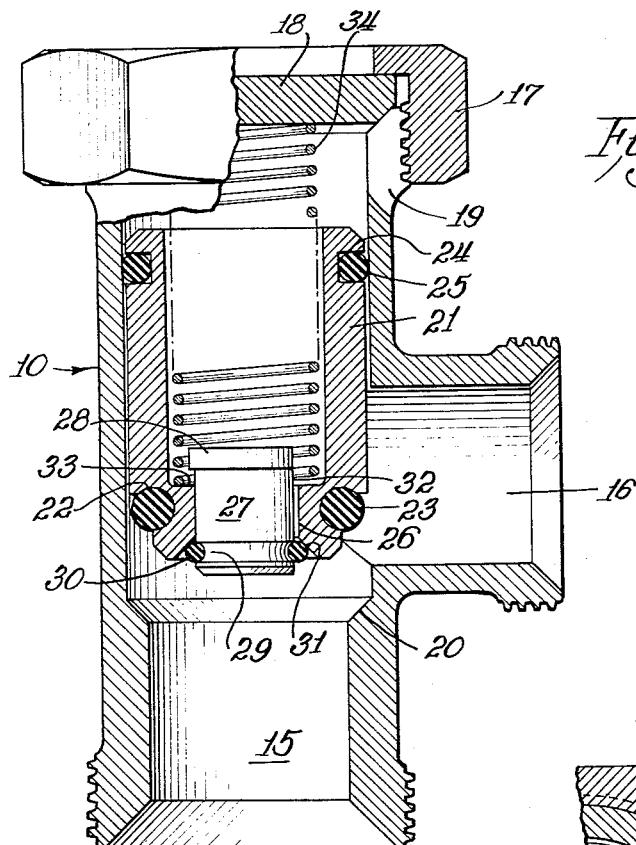
Fig. 3 is a sectional view corresponding to Fig. 2 showing the valve in open position.
Figure 5:
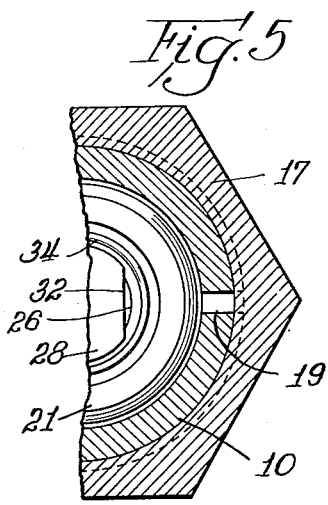
Fig. 5 is a view on the line 5—5 of Fig. 2.
Figure 4:
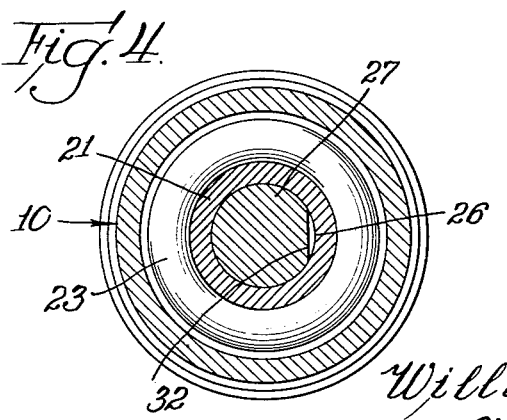
Fig. 4 is a view on the line 4—4 of Fig. 2.

A somewhat cup-shaped cylindrical valve spool 21 is slidably mounted inside the valve 10 in a manner to reciprocate from a closed position as shown in Fig. 2 to an open position in which the spool 21 is retracted upwardly from the seat 20 as shown in Fig. 3. The spool 21 is provided adjacent its lower end with a peripheral O ring groove 22 in which is seated an O ring 23 made of neoprene or other resilient material, said O ring 23 being adapted to engage the bevelled seat 20 to seal off the inlet 15 from the outlet 16.

Adjacent its upper end the spool 21 is provided with a second peripheral O ring groove 24 in which an O ring 25 is seated. The outside diameter of the spool 21 is slightly less than the inside diameter of the valve 10 so as to permit free reciprocal motion of the spool 21 in the valve 10, and the outside diameter of the O ring 25 is greater than the inside diameter of the valve 10 so that it is compressed between the groove 24 and the interior wall of the valve 10 to insure liquid sealing relation between the spool 21 and the valve 10.

The spool 21 is provided in its cup-like base with a cylindrical opening 26 in which a plug 27 is disposed. The plug 27 is preferably made of nylon or other impervious plastic material and has a head or flange 28 at the top of greater diameter than the opening 26 in the spool 21 so that the plug 27 is normally supported in the opening 26 by said flange 28.

The plug 27 is of greater length than the opening 26 and is provided adjacent its lower end with a peripheral groove 29 in which an O ring 30 is seated. The lower end of the opening 26 is provided with a bevelled seat 31 against which the O ring 30 is adapted to engage in liquid sealing relation when the plug 27 is raised in the opening 26 as shown in Fig. 3.

Along one side of the plug 27 a longitudinal portion is removed as shown in Figs. 2 and 3 to provide a flat face 32 as shown in Figs. 2 and 3 to provide an air bleed through the opening 26 when the plug 27 is at rest in the open position as shown in Fig. 2.

The cup-like base of the spool 21 provides a peripheral shoulder 33 against which one end of a helical spring 34 is adapted to bear, the opposite end of said spring 34 being adapted to bear against the cap 18 so as to bias the spool 21 resiliently toward the bevelled seat 20.

When the pump 13 is not in operation, the valve spool 21 is urged by the spring 34 into the closed position shown in Fig. 2, and the plug 27 is at rest in the open position as shown in Fig. 2. Assuming that the pump 13 has not been in operation for a while, it is likely that air would be present in the liquid supply duct 14.

When the processing chamber 12 is placed in operation, air is first removed from the chamber 12 and conditions of temperature and pressure are balanced to place the chamber 12 in readiness to receive milk or other liquid to be processed. The pump 13 is then placed in operation and initially it serves to pump air in the duct 14 upwardly through the air bleed between the flat face 32 of the plug 27 and the opening 26 in the base of the spool 21. The movement of air is insufficient to raise or hold the plug 27 in retracted position in the opening 26. Thus as long as air is being pumped upwardly through the duct 14 it passes through the air bleed to the slot 19 where it passes radially out of the valve 10 to atmosphere.

When the milk or other liquid reaches the level of the spool 21, after evacuation of all air from the duct 14, the pressure of the liquid against the plug 27 forces it upwardly in the opening 26 until the O ring 30 engages the conical seat 31 as shown in Fig. 3, thus sealing the opening 26 and the air bleed between said opening 26 and the flat face 32. As pressure on the liquid is increased by continued operation of the pump 13 to a point where it exceeds the pressure of the spring 34, the spool 21 is forced upwardly in the valve 10 as shown in Fig. 3 sufficiently to permit liquid to flow therepast from the inlet 15 to the outlet 16 and therefrom through the short duct 11 to the chamber 12.

When the pump 13 is shut off or if it fails to maintain sufficient pressure to hold the spool 21 in retracted position, the spring 34 urges the spool 21 back into seated position against the seat 20, thus preventing further communication between the inlet 15 and the outlet 16. If liquid is drained back through the supply duct 14, air is admitted from atmosphere through the slot 19 into the interior of the valve 10 and as the plug 27 drops back to normal position as shown in Fig. 2 said air passes downwardly through the air bleed between the opening 26 and the flat face 32 into the supply duct 14.

While I have shown and described my invention in a preferred form, I am aware that various modifications can be made therein without departing from the spirit of my invention, the scope of which is to be determined by the appended claims.

I claim:

1. A double acting valve of the class described comprising a tubular valve body adapted to be disposed vertically with a closure at the top, an inlet port at the bottom, and a lateral outlet disposed therebetween, said valve body being provided with an air bleed adjacent the top and an internal seat between the outlet and the inlet port, a cup-shaped element reciprocably mounted in said valve body with an open top disposed toward the top of the valve, said element being biased toward said seat in outlet straddling relation and having an opening in the bottom with a circumferential seat at the lower side, and a plug with bypass means therein retractably mounted in said opening and weight biased in unretracted position, said plug being provided at the bottom with sealing means adapted to engage said circumferential seat in sealing relation when said plug is retracted.

2. A double acting valve of the class described comprising a tubular valve body adapted to be disposed vertically with a closure at the top, an inlet port at the bottom, and a lateral outlet disposed therebetween, said valve body being provided with an air bleed adjacent the top and an internal seat between the outlet and the inlet port, a cup-shaped element reciprocably mounted in said valve body with an open top disposed toward the top of the valve, said element being resiliently biased toward said seat in outlet straddling relation and having an opening in the bottom with a circumferential seat at the lower side, and a plug with bypass means therein retractably mounted in said opening and weight biased in unretracted position, said plug being provided at the bottom with sealing means adapted to engage said circumferential seat in sealing relation when said plug is retracted.

3. A valve of the class described comprising the combination of a valve body with a vertical passage therein closed at the top and open at the bottom to provide an inlet port, said body having a vent near the top communicating laterally with said passage, a seat in said passage below and adjacent the outlet port, a cup-shaped valve element movable in said passage and having an opening in the bottom thereof, resilient means biasing said element from the top of said passage into sealing engagement with said seat, said element being of sufficient length to close off said outlet port when the element is in seated position, the upper portion of said element sealingly engaging said passage to prevent leakage from the outlet port into the portion of said passage above said element, a retractable valve plug extending through and partially filling the opening in said valve element, means to prevent said plug from passing through said opening, and means on the lower end of said plug adapted sealingly to close said opening when said plug is retracted; said plug normally being in a position to communicate the inlet port with the upper portion of said passage through the opening in said valve element.

4. A valve of the class described comprising the combination of a valve body with a vertical passage therein closed at the top and open at the bottom to provide an inlet port, said body having a vent near the top communicating said passage with the atmosphere, an outlet port in said valve body communicating laterally with said passage, a peripheral seat in said passage below and adjacent the outlet port, a cup-shaped valve element movable in said passage and having a circular opening in the bottom thereof, resilient means biasing said element from the top of said passage into sealing engagement with said seat, said element being of sufficient length to close off said outlet port when the element is in seated position, the upper portion of said element sealingly engaging said passage to prevent leakage from the outlet port into the portion of said passage above said element, a circular-shaped valve plug retractable in said circular opening in said valve element, a head on said valve plug of larger diameter than the opening in said element, said plug having a flattened side thereby only partially filling said circular opening to create an interior port, and an O ring seal on the lower end of said plug to seal said opening and close said interior port when said plug is retracted, said plug normally being in a position to communicate the inlet port with the upper portion of said passage through the interior port in said valve element.

References Cited in the file of this patent

UNITED STATES PATENTS

| 651,289 | Benton | June 5, 1900 |
| 818,411 | Bush | Apr. 24, 1906 |
| 1,402,218 | Cushing | Jan. 3, 1922 |
| 2,490,511 | Courtot | Dec. 6, 1949 |
| 2,756,772 | Clark | July 31, 1956 |